Patented Jan. 24, 1928.

1,657,128

UNITED STATES PATENT OFFICE.

KARL R. LINDFORS, OF SAGINAW, MICHIGAN, ASSIGNOR TO MICHIGAN SUGAR COMPANY, OF SAGINAW, MICHIGAN.

METHOD OF MAKING FERTILIZER MATERIAL.

No Drawing. Application filed February 12, 1926. Serial No. 87,953.

This invention is a novel method of making fertilizer material from concentrated Steffens liquor and peat, or from distillery slop and peat.

My improvement is the outcome of extensive research and experimentation, systematically caried on over a long period of time with the object of discovering some controlling factor, phase, or reaction, among the steps of the old fermentation method of making peat fertilizer that might be advantageously altered or improved upon, whereby finished fertilizer of better quality could be obtained more quickly, at less cost. I desire to accomplish these results without adding any special re-agents or chemicals to the usual basic materials theretofore employed, namely, peat, Steffens concentrate, or distillery slop and phosphate; and to eliminate, if possible, the time-consuming step, fermentation.

My present claimed method does reduce the time of manufacture, although using the same basic materials, to about one fortieth of that formerly required. Moreover, it reduces the cost, yields a product of better and more uniform grade, and eliminates the fermentation step of the old method.

The advance that I have attained by this new method over the former practice is an extremely simple one, but very important. It relates to the conditioning of the peat, or liquor, or both of them, with respect to temperature, moisture content and possibly also with respect to their air content, at the moment they are mixed. The invention, therefore, belongs to that class of discoveries in which a new result is attained by the same elements when assembled and manipulated in the old manner.

The new result is attained by a novel method of manipulating the materials in a consecutive series of progressive steps, some of which are old, others new.

I start with a quantity of peat, either in its original condition as dug, (containing about sixty per cent by weight of water), or after it has been air- and sun-dried (until it contains about forty per cent of water). The peat is then heated while being agitated, preferably in contact with hot surfaces such as steam pipes, and in the presence of a current of hot air, as in a drier. The degree of heat, namely, close to the boiling point of water, is such that most of the air and water are driven off very rapidly. The air, gas and water vapor rise in clouds.

Heating is continued until the hot peat shows a moisture content of about twenty per cent by weight and its temperature as it emerges from the drier is about eighty to ninety degrees centigrade. Immediately the hot, dry, air-freed peat is drenched with hot Steffens concentrate containing about forty per cent moisture, or with hot distillery slop liquor, or with whatever equivalent potash-bearing liquor may be employed in lieu of them. Quick drenching may be accomplished by delivering the hot peat direct from the drier into a body of the hot liquor, or by spraying the hot liquor on the peat as it comes from the drier, or both.

The hot peat will take up the hot liquor to such extent that the mixture will contain about equal parts, by weight, of liquor and peat. The hot plastic mixture, therefore, contains about thirty per cent moisture, and is of a semi-fluid consistency. It has the property of quickly changing its physical appearance and characteristics upon exposure to the air. For instance, if the fresh-mixed plastic mass is put into a cart and wheeled a hundred feet or so to a store room, it changes even in that short time, say, about five minutes, from a state of semi-fluidity to that of an apparently dry fine powder that feels to the touch like finely ground sun-dried natural peat. This mass is practically free from chunks or lumps, and such lumps as are formed will readily fall apart into powder. The mixture is next spread, as on a floor, to a depth of one and one half to two feet. Within twenty-four to forty-eight hours the atmospheric exposure, continued drying and partial cooling bring the moisture content down to about twenty-five per cent. At this time certain chemical reactions evidently take place. The exact nature of these reactions is not known to me at the present time, but they appear to be mainly processes of oxidation. The degree of dryness attained, namely, twenty-five per cent moisture, is about right for the proper admixture of phosphate, which may be applied at this time or later, as desired.

The completed fertilizer is stored in piles preparatory to shipping.

My entire process up to the addition of phosphate may be completed in less than forty-eight hours, whereas the old methods required two or three months to bring the mixture to the powdery or granular stage.

The attainment of this desirable result depends primarily upon the two steps, namely, heating the peat to drive off its air and water, and then, before cooling and re-absorption of air can take place, mixing the hot peat with approximately an equal weight of hot Steffens or equivalent liquor. This liquor, at temperatures around eighty to ninety degrees centigrade, is thoroughly fluid and quickly penetrates the interstices of the peat particles by the processes of adsorption and capillary action.

At this stage there occurs a radical and fundamental departure from the method heretofore employed.

According to the old method, the peat and liquor were usually mixed cold, or at about atmospheric temperature, or else the peat was cold and the liquor alone hot, to render it more fluid. After mixing, the material was stored in large piles for a period of two or three months, during which time internal heating and fermentation occurred. To prevent over-heating, the pile was periodically forked by hand.

In my described process fermentation does not occur to any appreciable extent and consequently the time heretofore required for fermentation is saved. As I have already pointed out, the hot dry peat and the hot fluidified liquor mix with extreme rapidity and thoroughness. Doubtless the liquor is taken up partly by absorption into the pores of the peat and partly by adsorption over the extensive aggregate areas of the peat particles, or by capillary action aided by suction created in the cells during the steam-and-air-liberating step above described. This intimate union of the peat and liquor is probably accompanied and followed by partial oxidation of the liquor. Before oxidation the solid matter of the liquor is highly deliquescent and if dried without oxidation will take up atmospheric moisture very rapidly, but after being oxidized the solid matter of the liquor loses nearly all of its moisture-absorbing properties and thereafter refuses not only to take up atmospheric moisture, but will readily give up its moisture content upon heating.

Consequently by mixture, made as above described, remains permanently dry and retains its powdery or granular character. This is especially true if oxidation is encouraged, as in the next step of my process. This step consists in spreading the freshly mixed material to cool in a layer of not more than one and one half to two feet thickness. The layer may be thinner if desired, although I have found this thickness satisfactory. If spread thicker than two feet, the mass is likely to develop a tendency to internal heating, but if less than two feet thick the heat is dissipated as it generates, and turning or forking the mass is, therefore, unnecessary.

My process is entirely chemical in its nature. Hence the necessary reactions take place with great rapidity. Since fungus or yeast growth or fermentation does not take place, as in the method heretofore practiced, exposure after mixing need not be continued longer than forty-eight hours. Losses of ammonia, which formerly occurred during fermentation, are here avoided, because the mixture is in completed powdery, granular condition, ready for the addition of phosphate within about twenty-four hours after its delivery from the mixer, before overheating caused by fermentation, with its consequent loss of ammonia, has had a chance to begin.

The necessary amount of phosphate may be applied at this stage, or later, as desired.

The mixture made according to the above method permanently retains its powdered or granular character, whereas under the old method of fermentation for two or three months, the mass became quite lumpy and had to be stirred or turned frequently after mixing.

From the foregoing description, it is plain that my method accomplishes, in about two days' time, the same or better results than heretofore have been accomplished with the same materials in three months, and that the improved results are due to the fact that the mixing is done with hot pre-dried peat and pre-heated liquor, the moisture content of the peat and liquor respectively, at the time of mixing, being such that the moisture in the mixture will be not more than thirty per cent by weight.

The resultant material, upon cooling, is dry enough to permanently maintain its powdery or granular form without being dusty, and wet enough to prevent the liquor from "settling out" previous to or during the mixing operation.

Having thus described my invention, what I claim and desire to secure by Letters Patent is:

1. The method of manufacturing fertilizer material consisting in, first, driving air and water from peat by application of heat until the moisture content is approximately one-fifth of the weight of the peat and the temperature of the peat is above eighty degrees centigrade, second, immersing the said peat while still hot and practically deprived of air, in hot potash-bearing liquor, third, draining the hot residual liquor from the hot saturated peat, and fourth, spreading the drained mixture to a depth of two feet or less, and allowing it to stand for twenty-four to forty-eight hours.

2. In the manufacture of fertilizer material from peat and potash-bearing liquor, the method of mixing which consists in applying sufficient heat to the peat to convert the greater part of its water content into steam and to drive off the entrained air, preheating the liquor and mixing the hot peat and hot liquor, for the purposes set forth.

In testimony whereof, I affix my signature.

KARL R. LINDFORS.